United States Patent

Cazort

[11] Patent Number: 5,297,763
[45] Date of Patent: Mar. 29, 1994

[54] SAFETY BALLOON APPARATUS

[76] Inventor: Brad A. Cazort, 8200 Alvin La., Little Rock, Ark. 72207

[21] Appl. No.: 24,377

[22] Filed: Mar. 1, 1993

[51] Int. Cl.⁵ .......................... B64B 1/40; B64B 1/58; B64B 1/62
[52] U.S. Cl. ....................... 244/31; 244/97; 244/99
[58] Field of Search ............. 244/31, 52, 96, 97, 244/98, 127, 128, 99

[56] References Cited

U.S. PATENT DOCUMENTS

| | | | |
|---|---|---|---|
| 151,124 | 5/1874 | Hartness | 244/31 |
| 1,714,079 | 5/1929 | Copeman | 244/31 |
| 3,534,927 | 10/1970 | Harding | 244/31 |
| 3,679,155 | 7/1972 | Centofanti | 244/32 |
| 3,945,591 | 3/1976 | Cameron | 244/98 |
| 4,711,416 | 12/1987 | Regipa | 244/31 |
| 4,836,471 | 6/1989 | Piccard | 244/99 |
| 4,865,266 | 9/1989 | George | 244/97 |

FOREIGN PATENT DOCUMENTS 2502795 10/1982 France ..................... 244/32

Primary Examiner—Michael S. Huppert
Assistant Examiner—Virna Lissi Ansley
Attorney, Agent, or Firm—Leon Gilden

[57] ABSTRACT

A balloon member includes a plurality of partition walls coextensive within the balloon to divide the balloon into equal quadrants to accommodate safe descent and enhance inflation of at least a plurality of the quadrants during a leakage of air from the balloon.

2 Claims, 4 Drawing Sheets

FIG. 1
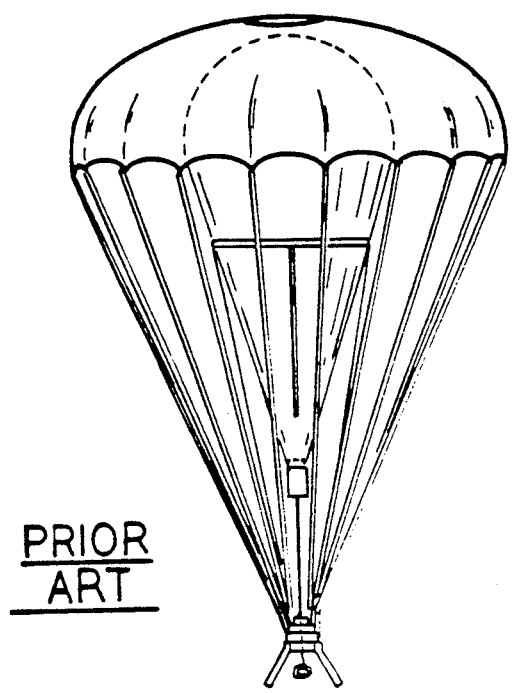
PRIOR ART
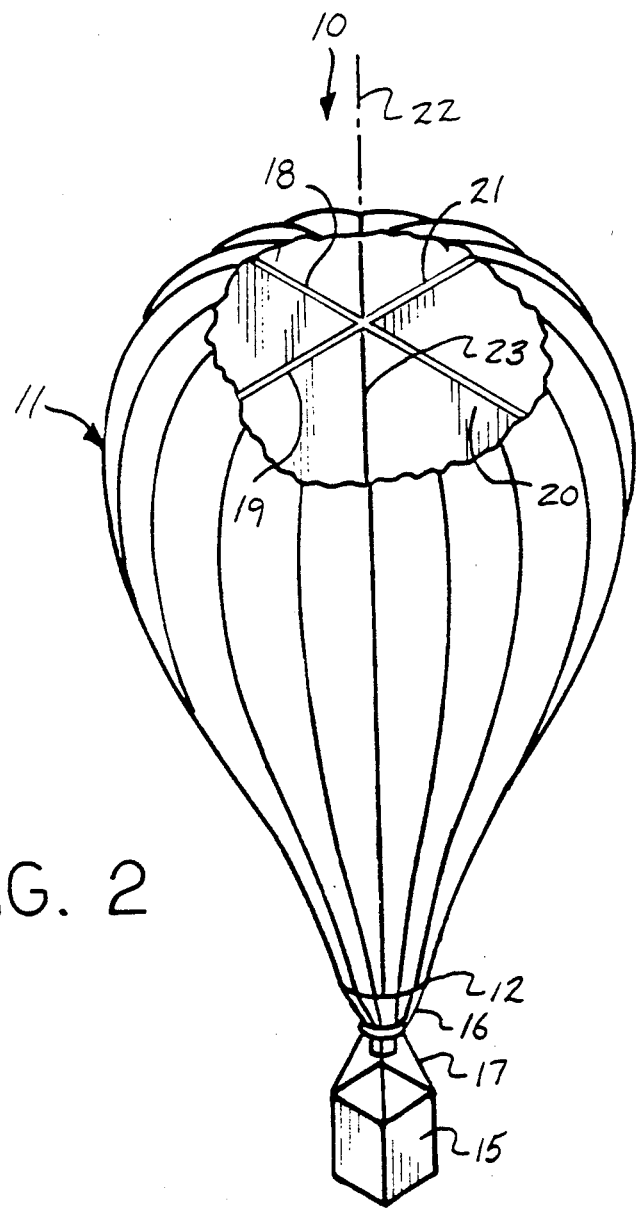
FIG. 2

SAFETY BALLOON APPARATUS

BACKGROUND OF THE INVENTION

1. Field of the Invention

The field of the invention relates to balloon structure, and more particularly pertains to a new and improved safety balloon apparatus arranged to divide the balloon structure into a plurality of pneumatic chambers.

2. Description of the Prior Art

Balloon structure of various types have been utilized throughout the prior art, wherein the U.S. Pat. Nos. 3,534,927; 3,945,591; 4,865,266; 3,679,155; and 4,836,471 are indicative of examples of the prior art structure, wherein the instant invention attempts to overcome deficiencies of the prior art, wherein during leakage of air to impart buoyancy to the balloon, the instant invention partitions the balloon into four individual pneumatic chambers symmetrically oriented about the balloon's axis to enhance the maintaining of buoyancy to accommodate ease of descent of the balloon and in this respect, the present invention substantially fulfills this need.

SUMMARY OF THE INVENTION

In view of the foregoing disadvantages inherent in the known types of balloon apparatus now present in the prior art, the present invention provides a safety balloon apparatus wherein the same divides the balloon into equal quadrants of pneumatic chambers. As such, the general purpose of the present invention, which will be described subsequently in greater detail, is to provide a new and improved safety balloon apparatus which has all the advantages of the prior art balloon apparatus and none of the disadvantages.

To attain this, the present invention provides a balloon member including a plurality of partition walls coextensive within the balloon to divide the balloon into equal quadrants to accommodate safe descent and enhance inflation of at least a plurality of the quadrants during a leakage of air from the balloon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety balloon apparatus which has all the advantages of the prior art balloon apparatus and none of the disadvantages.

It is another object of the present invention to provide a new and improved safety balloon apparatus which may be easily and efficiently manufactured and marketed.

It is a further object of the present invention to provide a new and improved safety balloon apparatus which is of a durable and reliable construction.

An even further object of the present invention is to provide a new and improved safety balloon apparatus which is susceptible of a low cost of manufacture with regard to both materials and labor, and which accordingly is then susceptible of low prices of sale to the consuming public, thereby making such safety balloon apparatus economically available to the buying public.

Still yet another object of the present invention is to provide a new and improved safety balloon apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a prior art balloon member mounted within a parachute structure, as indicated in U.S. Pat. No. 3,679,155.

FIG. 2 is an isometric illustration, partially in section, of the balloon structure of the invention.

DESCRIPTION OF THE PREFERRED EMBODIMENT

Figure 3:
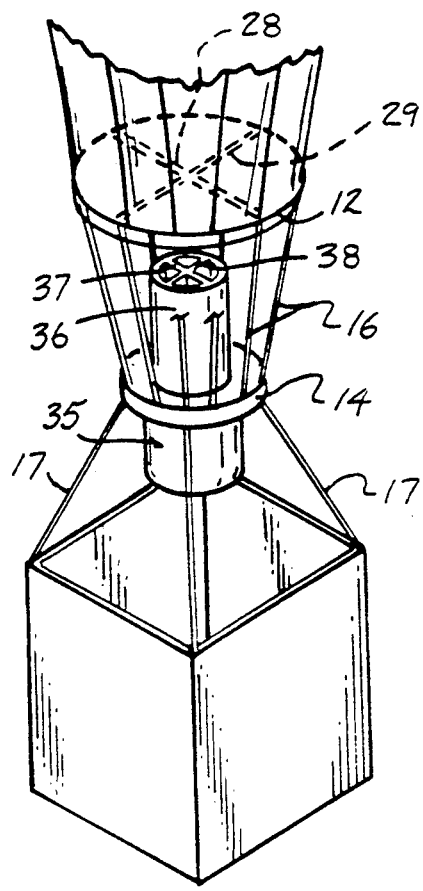
FIG. 3 is an enlarged orthographic view of the balloon support container at a lowermost end portion.
Figure 4:
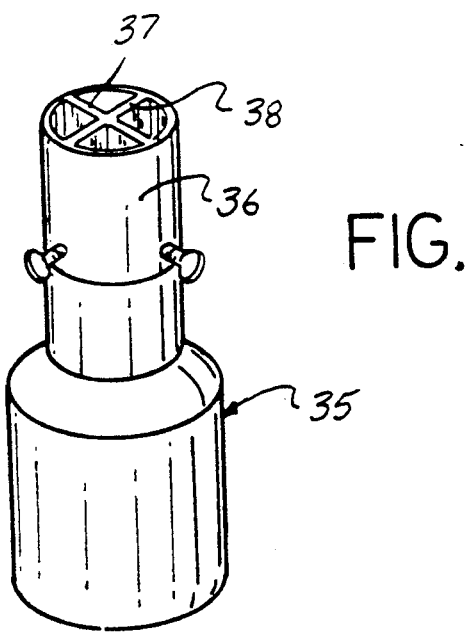
FIG. 4 is an enlarged isometric illustration of the burner assembly of the invention.

With reference now to the drawings, and in particular to FIGS. 1 to 8 thereof, a new and improved safety balloon apparatus embodying the principles and concepts of the present invention and generally designated by the reference numeral 10 will be described.

Figure 5:
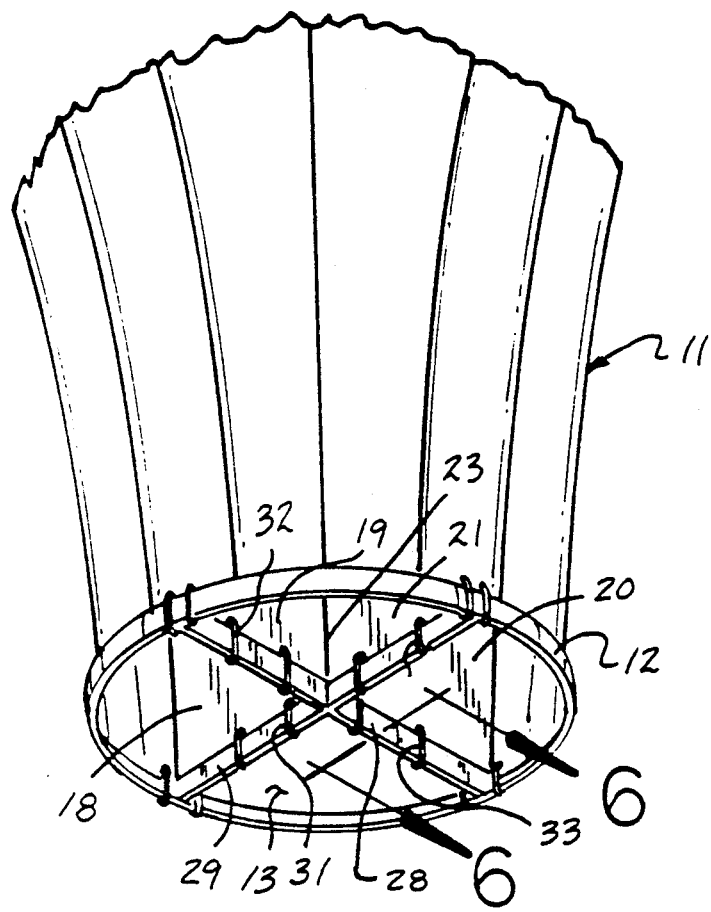
FIG. 5 is an isometric bottom view of the balloon and its entrance opening.

More specifically, the safety balloon apparatus 10 of the instant invention essentially comprises a balloon member 11 of flexible construction, having a rigid entrance ring 12 at its lowermost end oriented at an inwardly tapered portion of the balloon defining a balloon entrance opening 13 (see FIG. 5). A support disc 14 is positioned below and coaxially aligned relative to the rigid entrance ring 12 along a balloon axis 22 about which the balloon member 11 and the entrance ring 12, as well as the support disc 14, are coaxially aligned in a spaced relationship. A support container 15 is positioned below the support disc 14, wherein first tether lines 16 arranged in a conical array extend between the support disc 14 and the balloon entrance opening 13 secured to the entrance ring 12, wherein second tether lines 17 extend from the container 15 to the support disc 14.

Figure 8:
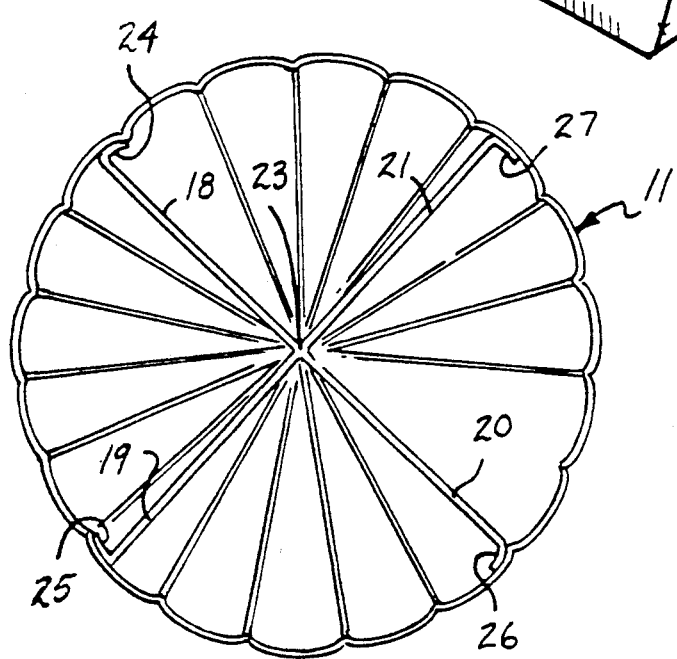
FIG. 8 is an orthographic view of the partition webs mounted within the balloon structure coaxially of the balloon dividing the balloon into four distinct pneumatic chambers.

Within the balloon, such as indicated in the FIGS. 2, 5, and 8, respective first, second, third, and fourth partition webs 18, 19, 20, and 21 are joined to a partition web junction 23 that is coaxially aligned within the balloon and along the balloon axis, with the partition webs dividing the interior cavity of the balloon member 11 into four equal quadrants defining four equal pneumatic chambers. A respective first, second, third, and fourth petition webs 18, 19, 20, and 21 include respective first, second, third, and fourth web outer periphery flanges 24, 25, 26, and 27 respectively permitting secured joining of each partition web relative to the interior surface of the balloon member 11 and joined utilizing either a sewn or adhesive interconnection. If desired, mechanical connections may also be employed securing the periphery flange of each partition web to the balloon member 11.

Within the entrance ring 12 are first and second mounting bars 28 and 29 that are diametrically aligned within the entrance ring 12, with the first and second mounting bars intersecting one another in an orthogonal relationship, with the first mounting bar 28 aligned with the lowermost edges of the first and fourth partition webs, with the second mounting bar 29 aligned and coextensive with the lowermost edges of the second and third partition webs. The first and second mounting bars 28 and 29 intersect at a mounting bar intersection 30 that is coaxially aligned with the axis 22.

Figure 6:
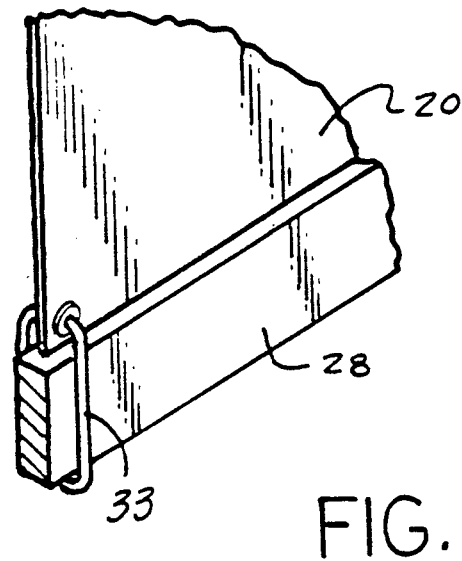
FIG. 6 is an isometric illustration, taken along the lines 6—6 of FIG. 5 in the direction indicated by the arrows.
Figure 7:
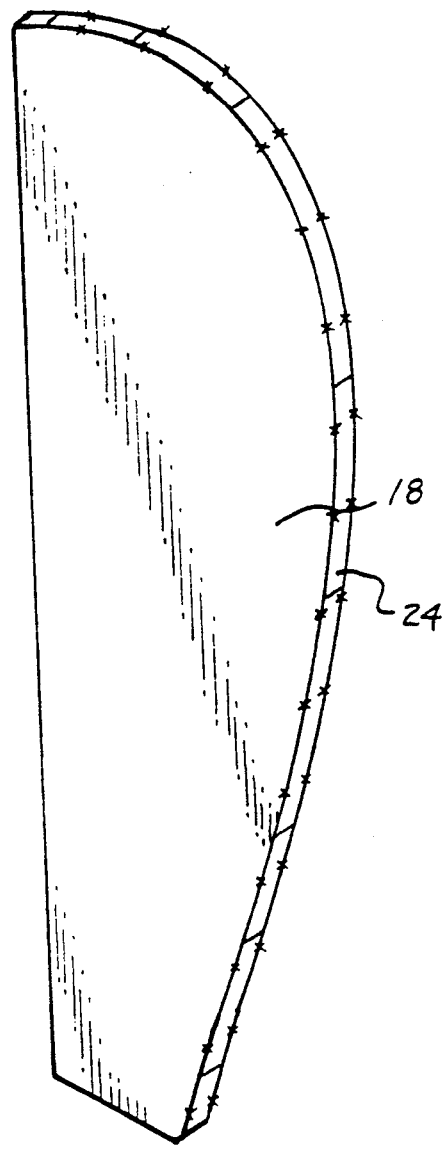
FIG. 7 is an isometric illustration of one of the partition webs employed by the invention.

The FIG. 5 and FIG. 6 indicate the use of support rings, and more specifically, first, second, third, and fourth support rings 31, 32, 33, and 34 respectively mounted to the respective lowermost edges of the first, second, third, and fourth partition webs 18, 19, 20, and 21. The first and fourth support rings 31 and 34 are slidably mounted along the first mounting bar on opposed sides of the mounting bar intersection 30, while the second and third support rings 32 and 33 are slidably mounted along the second mounting bar 29 on opposed sides of the mounting bar intersection 30. In this manner, the partition webs are arranged permitting ease of pivotal mounting of the partition webs relative to the mounting bars in use, wherein a burner assembly 35 is provided that is coaxially aligned with the axis 22 and further, the burner assembly 35 having a nozzle tube 36, such as indicated in the FIG. 4. The nozzle tube 36 includes nozzle tube first and second divider walls 37 and 38, with the first and second divider walls 37 and 38 arranged in a parallel and coplanar relationship relative to the respective first and second mounting bars 28 and 29 positioned therebelow to enhance equal distribution of heated air into the four distinct pneumatic chambers within the balloon apparatus 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety balloon apparatus, comprising, a flexible balloon member having a lowermost entrance opening including a rigid entrance ring mounted to the entrance opening, and the balloon member coaxially aligned about a balloon axis, with the entrance ring coaxially and symmetrically oriented relative to the balloon axis at the balloon entrance opening, and the entrance ring including a first mounting bar and a second mounting bar, wherein the first mounting bar and the second mounting bar orthogonally intersect one another, and the first mounting bar and the second mounting bar are diametrically aligned within the entrance ring, and a support disc positioned below the entrance ring coaxially aligned along the balloon axis, and a support container positioned below the support disc coaxially aligned relative to the balloon axis, wherein first tether lines arranged in a conical array extend from the entrance ring to the support disc, and second tether lines extend from the support disc to the support container, and the support disc mounting a burner assembly, with the burner assembly including a nozzle tube in a facing relationship relative to the entrance opening, and the burner assembly and the nozzle tube are coaxially aligned along the balloon axis, and the balloon member includes a balloon cavity therewithin, and the balloon cavity having a first partition web, a second partition web, a third partition web, and a fourth partition web joined at a partition web junction, the partition web junction arranged coextensively within the balloon member, and coaxially aligned along the balloon axis, and the first partition web, the second partition web, the third partition web, and the fourth partition web secured within the balloon member dividing the balloon member into four pneumatic distinct chambers, and the first partition web having a first web lowermost edge, the second partition web having a second partition web lowermost edge, the third partition web having a third partition web lowermost edge, and the fourth partition web having a fourth partition web lowermost edge, wherein each lowermost edge is positioned in adjacency to the entrance ring, with the partition web lowermost edge and the fourth partition web lowermost edge aligned with the first mounting bar coextensive therewith, and the second partition web and the third partition web aligned with the second mounting bar coextensive therewith, wherein the first partition web lowermost edge includes a plurality of first support rings mounting the first partition web pivotally to the first mounting bar, the third partition web lowermost edge including third support rings pivotally mounting the third partition web lowermost edge in adjacency to the first mounting bar, the second partition web lowermost edge having second support rings mounting the second partition web pivotally to the second mounting bar, and the third partition web lowermost edge having third support rings pivotally mounting the third partition web pivotally to the second mounting bar.

2. An apparatus as set forth in claim 1 wherein the burner assembly includes a nozzle tube, the nozzle tube having a first divider wall and a second divider wall, the first divider wall orthogonally intersects the second divider wall, with the first divider wall arranged parallel to and coplanar with the first mounting bar, and the second divider wall oriented parallel to and coplanar with the second mounting bar to direct heat from the burner assembly into the four pneumatic chambers.

* * * * *